(12) United States Patent
Noh

(10) Patent No.: US 7,541,845 B2
(45) Date of Patent: Jun. 2, 2009

(54) SIGNAL RECEIVER APPARATUS AND METHOD FOR DETECTING LOGIC STATE REPRESENTED BY AN INPUT SIGNAL AND SEMICONDUCTOR INTEGRATED CIRCUIT DEVICE HAVING THE SAME

(75) Inventor: Kwang-Sook Noh, Kyungki-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 710 days.

(21) Appl. No.: 10/093,485

(22) Filed: Mar. 11, 2002

(65) Prior Publication Data

US 2003/0043935 A1 Mar. 6, 2003

Related U.S. Application Data

(60) Provisional application No. 60/316,465, filed on Aug. 31, 2001.

(51) Int. Cl.
 *H03K 5/153* (2006.01)
(52) U.S. Cl. .................................. 327/72; 327/91
(58) Field of Classification Search ................ 327/52, 327/56, 60, 63–65, 77–83, 89–91, 94, 96, 327/337, 72, 73, 68, 69, 93
See application file for complete search history.

(56) References Cited

U.S. PATENT DOCUMENTS

| | | | |
|---|---|---|---|
| 4,848,881 A * | 7/1989 | Kahan et al. | 359/288 |
| 5,050,190 A | 9/1991 | Shimada et al. | |
| 5,488,449 A * | 1/1996 | Joo | 396/125 |
| 5,801,552 A * | 9/1998 | Moore | 327/62 |
| 5,900,749 A * | 5/1999 | Hendrickson et al. | 327/96 |
| 5,933,459 A | 8/1999 | Saunders et al. | 375/317 |
| 6,157,688 A | 12/2000 | Tamura et al. | 375/348 |
| 6,433,591 B2 * | 8/2002 | Sasaki | 327/102 |
| 6,469,561 B2 * | 10/2002 | Pernigotti et al. | 327/336 |
| 2001/0026374 A1 * | 10/2001 | Tominaga | 358/1.15 |

FOREIGN PATENT DOCUMENTS

| | | | |
|---|---|---|---|
| JP | 53110784 | * | 9/1978 |
| JP | 62-154928 | | 7/1987 |
| JP | 10-223922 | | 8/1998 |

OTHER PUBLICATIONS

William J. Dally, "Transmitter Equalization For 4-GBPS Signaling," IEEE Micro, Jan.-Feb. 1997, pp. 48-56.
German Office Action dated Jun. 29, 2006.

* cited by examiner

*Primary Examiner*—Long Nguyen
*Assistant Examiner*—Ryan C Jager
(74) *Attorney, Agent, or Firm*—Harness, Dickey & Pierce, P.L.C.

(57) ABSTRACT

In the semiconductor integrated circuit, an apparatus for detecting a logic state represented by an input signal includes a reference signal generating circuit and a determining circuit. The reference signal generating circuit generates a reference voltage based on a previously received input signal voltage, and the determining circuit determines a logic state represented by a currently received input signal voltage based on the reference voltage.

18 Claims, 6 Drawing Sheets

SIGNAL RECEIVER APPARATUS AND METHOD FOR DETECTING LOGIC STATE REPRESENTED BY AN INPUT SIGNAL AND SEMICONDUCTOR INTEGRATED CIRCUIT DEVICE HAVING THE SAME

CONTINUING APPLICATION DATA

The benefit of priority under 35 U.S.C. §119(e) is claimed on U.S. Provisional Application No. 60/316,465 filed Aug. 31, 2001, the entire contents of which are hereby incorporated by reference.

FIELD OF THE INVENTION

The present invention generally relates to a data signal receiver apparatus and method and, more particularly, to a signal receiver apparatus and method that are applicable to high-speed semiconductor integrated circuit devices.

BACKGROUND OF THE INVENTION

When a data signal is transmitted from one semiconductor integrated circuit (IC) device to another semiconductor IC device, the IC device receiving the data signal typically identifies the logic level or logic state (i.e., the data value) of the received signal by use of a fixed reference signal of a fixed voltage. For example, where the transmitting part of an IC device transmits a signal of the waveform shown in FIG. 1A and the receiving part of the IC device receives a signal of the waveform shown in FIG. 1B, the receiving part identifies a data value ("0" or "1") represented by the received signal by comparing the voltage level of the received signal with a fixed reference voltage level REF.

As the transmission speed of the electrical signal increases, the difference between voltage level changes in the received electrical signal decreases. This results in a possible decrease in the difference between the voltage level of the received data signal and the voltage level of the reference signal, and makes it difficult to identify the logic state of the received signal. In addition, when an intermediate voltage level of the received signal is not identical with the voltage level of the transmitted signal due to noise or the like, there is a high possibility that the data value of the received signal is erroneously identified. The signal portions ①, ②, ③, and ④ of the received signal of FIG. 1B are specific examples, each of which has a high possibility of erroneous identification.

SUMMARY OF THE INVENTION

The signal detecting method according to the present invention adjusts a fixed reference voltage based on the voltage level of a previously received input signal, and uses the adjusted reference voltage to determine the logic level or state represented by a currently received input signal. By dynamically adjusting the reference voltage used to determine the logic state represented by an input signal, the logic state is accurately identified irrespective of transmission speed and noise.

In one embodiment, the semiconductor integrated circuit includes a signal receiver apparatus having a clock generator for generating a plurality of internal clock signals synchronized with an external clock signal, and a fixed reference signal generator for generating a fixed reference signal of a predetermined fixed voltage level. The clock generator generates, preferably, two internal clock signals that are complementary signals having phases opposite to each other. The signal receiver apparatus further includes a sampling circuit, a reference signal generating circuit, a determining circuit, and a latch circuit. The sampling circuit receives a data signal and the fixed reference signal in synchronization with the internal clock signals, and samples them. The reference signal generating circuit generates a charge-shared voltage of the sampled voltage levels of the data signal and the fixed reference signal. Specifically, the reference signal generating circuit averages the voltage levels of the received data signal and the fixed reference signal, which have been sampled in the preceding data bit period. This adjusted reference signal is output from the reference signal generating circuit and varies with the voltage level of the data signal received in the preceding data bit period. The adjusted reference signal is provided to the determining circuit, which compares the sampled data signal with the adjusted reference signal to identify the logic level or data value of the received data signal. An output of the determining circuit is stored in the latch circuit.

In one embodiment, the sampling circuit is comprised of switch circuits and capacitors, the reference signal generating circuit is comprised of switch circuits, and each of the switch circuits consists of semiconductor transistor devices such as MOS transistors or bipolar transistors.

As described above, the signal receiver apparatus of the present invention generates an adjusted reference signal that dynamically varies in accordance with the voltage level of a data signal received in the preceding data bit period, and identifies the logic level of a data signal currently received based on the dynamically adjusted reference signal. Thus, the signal receiver apparatus of the invention can improve the accuracy of detecting the logic state represented by the received data signal irrespective of transmission speed and noise. Particularly, the signal receiver apparatus of the invention is suitably applicable to a low-voltage and high-speed semiconductor memory integrated circuit device, such as Rambus, synchronous, DDR (Double Data Rate), and EDO (Extended Data Out) DRAMs. However, it should be noted that the signal receiver apparatus of the invention is applicable to any semiconductor integrated circuit device.

DETAILED DESCRIPTION OF EMBODIMENTS

Figure 1A:
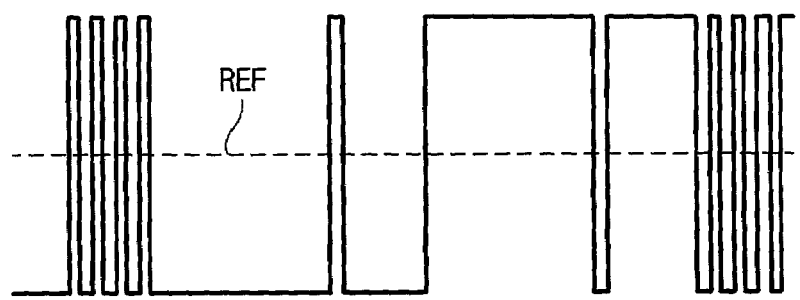
FIG. 1A is a waveform diagram of a transmitted signal.
Figure 1B:
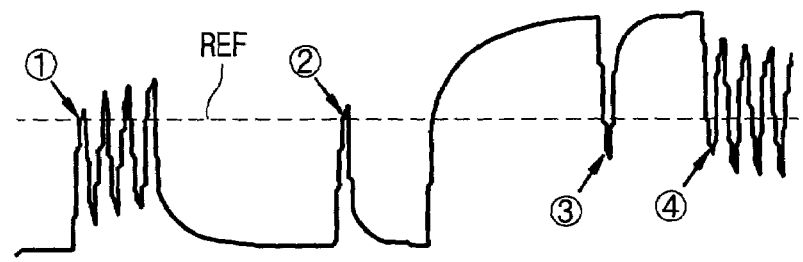
FIG. 1B is a waveform diagram of a received signal corresponding to the transmitted signal of FIG. 1A useful for explaining a prior art method of identifying the logic level of the received signal using a reference signal of a fixed voltage level.
Figure 2:
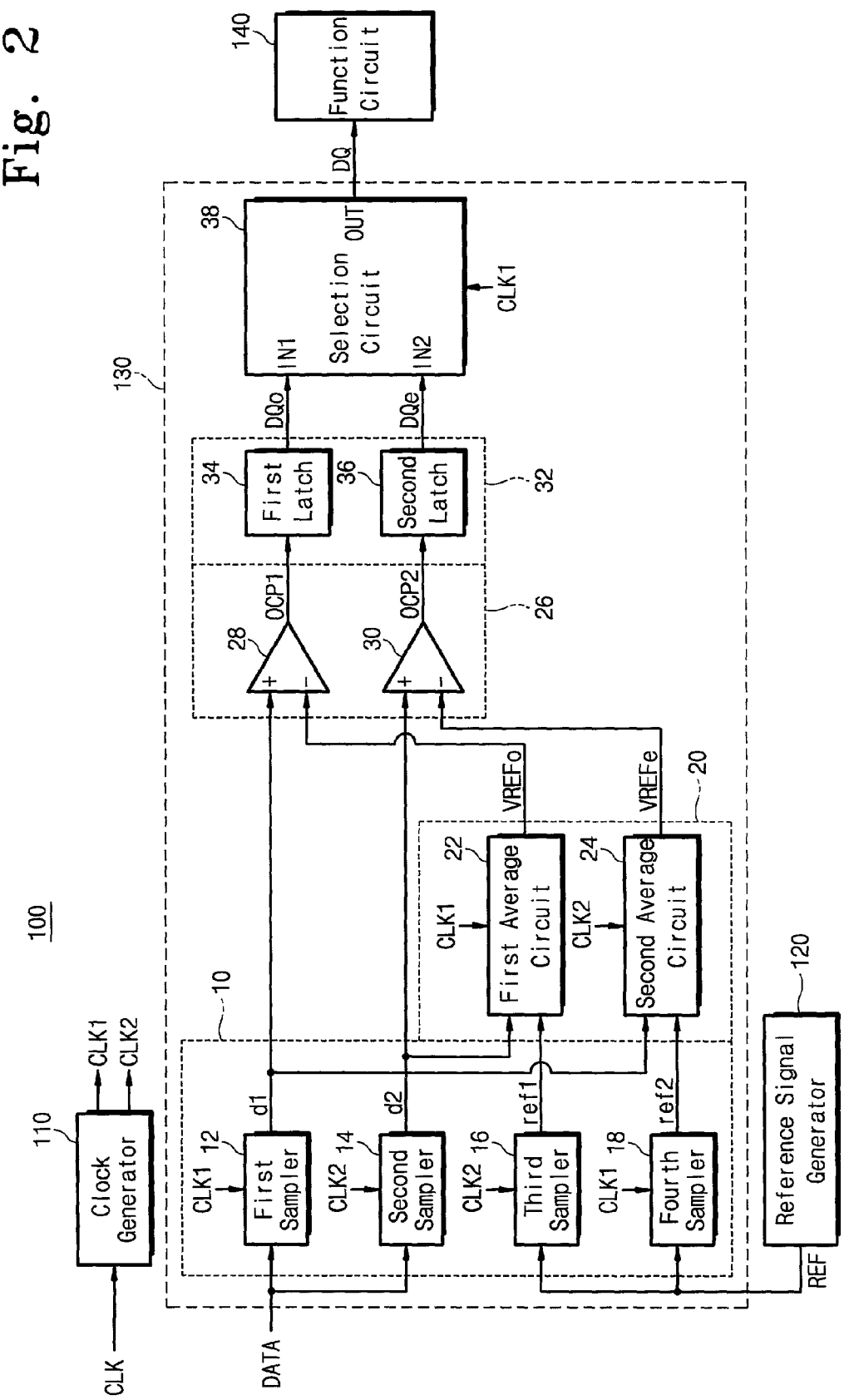
FIG. 2 is a block diagram showing a circuit configuration of an embodiment of a signal receiver apparatus according to the present invention.
Figure 3:
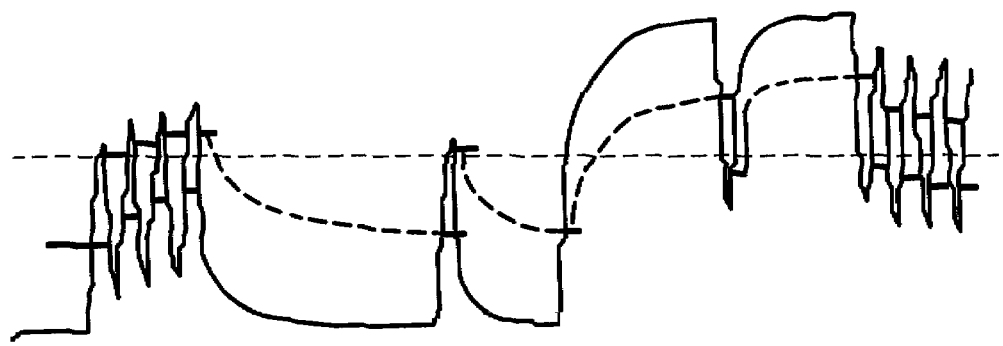
FIG. 3 is a waveform diagram for explaining a logic level identification technique according to the present invention.

FIG. 2 is a block diagram, which schematically illustrates a circuit configuration of an embodiment of a signal receiver apparatus according to the present invention, and FIG. 3 is a waveform diagram for explaining a logic level identification technique according to the invention.

Figure 4:
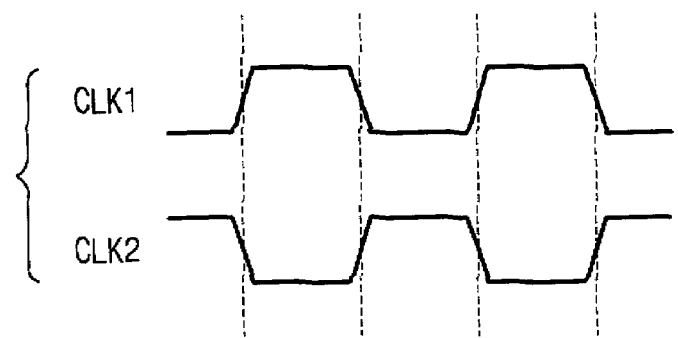
FIG. 4 is a timing diagram of clock signals shown in FIG. 2.

Referring to FIG. 2, a signal receiver apparatus 100 includes a clock generator 110 that is synchronized with a clock signal CLK externally provided (hereinafter referred to as "external clock signal") to internally generate first and second clock signals CLK1 and CLK2 (hereinafter referred to as "first and second internal clock signals CLK1 and CLK2"). The first and second internal clock signals CLK1 and CLK2 are complementary signals having phases opposite to each other, as shown in FIG. 4. Alternatively, the receiver apparatus 100 may receive clock signals CLK1 and CLK2 from the exterior. In this case, the receiver apparatus 100 does not need the clock generator 110.

The receiver apparatus 100 includes a fixed reference signal generator 120 for internally generating a fixed reference signal REF of a predetermined fixed voltage level. Alternatively, the receiver apparatus 100 may receive a fixed reference signal REF from the exterior. In such a case, the receiver apparatus 100 does not need the fixed reference signal generator 120.

The receiver apparatus 100 further includes a data receiving unit 130 for receiving and sampling a data signal DATA externally provided in synchronization with the first and second internal clock signals CLK1 and CLK2.

The frequency of the first and second internal clock signals CLK1 and CLK2 may be identical with that of the external clock signal CLK, or may be twice the frequency of the external clock signal CLK. In both of the cases, data is provided to the data receiving unit 130 in synchronization with every rising edge (or falling edge) of the first and second internal clock signal CLK1 and CLK2 so that the data receiving unit 130 may receive two or four data per cycle of the external clock signal CLK.

In addition, the frequency of the first or second internal clock signal CLK1 or CLK2 may be four or eight times the frequency of the external clock signal CLK. In this case, the data receiving unit 130 may receive eight or sixteen data per cycle of the external clock CLK.

For simplicity of the following explanation, the case where the frequency of the first and second internal clock signals CLK1 and CLK2 are identical with that of the external clock signal CLK and data is provided to the data receiving unit 130 in synchronization with the rising edges of the first and second internal clock CLK1 and CLK2 will be described. However, it should be understood that the present invention is not limited to this case and is applicable to a SDR (single data rate), a QDR (quadruple data rate), an ODR (octuple data rate), etc., semiconductor integrated circuit device.

The data receiving unit 130 samples the fixed reference signal REF in synchronization with the first and second internal clock signals CLK1 and CLK2. The voltage level of a data signal DATA received in a current clock cycle is identified using, in part, the sampled fixed reference signal REF. An output DQ of the data receiving unit 130 is connected to a function circuit 140 such as a semiconductor memory integrated circuit.

The data signal DATA, which is transmitted from external data processing system(not shown), may be a signal whose swing ranges from 1.2V to 1.6V. However, it will be recognized that the present invention is not limited to this range. The data signal DATA is driven by external output driver in synchronization with the rising and falling edge of the external clock CLK. The data receiving unit 130 receives odd-numbered data of the data signal DATA at the synchronization with the rising edge of a first internal clock CLK1 and receives even-numbered data of the data signal DATA in synchronization with the rising edge of a second internal clock CLK2. Preferably, the voltage level of the fixed reference signal REF is the intermediate value of the voltage range of the received data signal.

As shown in FIG. 2, the data receiving unit 130 includes a sampling circuit 10, a reference signal generating circuit 20 connected to the sampling circuit 10, a determining circuit 26 connected to the sampling circuit 10 and the reference signal generating circuit 20, a latch circuit 32 connected to the determining circuit 26, and a selection circuit 38 connected to the latch circuit 32.

The sampling circuit 10 includes first through fourth samplers 12, 14, 16, and 18. The first and fourth samplers 12 and 18 sample the data signal DATA and the fixed reference signal REF, respectively, during a high period of the first internal clock signal CLK1. The second and third samplers 14 and 16 sample the data signal DATA and the fixed reference signal REF, respectively, during a high period of the second internal clock signal CLK2. Therefore, the first sampler 12 samples odd-numbered data of the data signal DATA, and the second sampler 14 samples even-numbered data of the data signal DATA. The third and fourth samplers 16 and 18 alternately sample the fixed reference signal REF during high periods of the first and second internal clock signals CLK1 and CLK2.

The reference signal generating circuit 20 includes a first average circuit 22 and a second average circuit 24.

During the high period of the first internal clock CLK1, the first average circuit 22 inputs the data d2 sampled during the high period of the second internal clock signal CLK2 by the second sampler 14. Also, during the high period of the first internal clock CLK1, the first average circuit 22 inputs a reference signal ref1 sampled during the high period of the second internal clock signal CLK2 by the third sampler 16. The first average circuit 22 outputs a first adjusted reference signal VREFo by charge-sharing the sampled data d2 and the sampled reference signal ref1 in synchronization with the first internal clock signal CLK1. The first adjusted reference signal VREFo is used as a reference signal for identifying the logic level of odd-numbered data d1 that is sampled by the first sampler 12 during the high period of the first internal clock signal CLK1.

During the high period of the second internal clock CLK2, the second average circuit 24 inputs the data d1 sampled during the high period of the first internal clock signal CLK1 by the first sampler 12. Also, during the high period of the second internal clock CLK2, the second average circuit 24 inputs a reference signal ref2 sampled during the high period of the first internal clock signal CLK1 by the fourth sampler 18. The second average circuit 24 is, during the second internal clock signal CLK2, supplied with the data d1 sampled, during the first internal clock signal CLK1 which is preceded with CLK2, by the first sampler 12 and a reference signal ref2 sampled, during the second internal clock signal CLK1 which is preceded with CLK2, by the fourth sampler 18. The second average circuit 24 outputs a second adjusted reference signal VREFe by charge-sharing the sampled data d1 and the sampled reference signal ref2 in synchronization with the second internal clock signal CLK2. This second adjusted reference signal VREFe is used as a reference signal for identifying the logic level of even-numbered data d2 that is sampled by the second sampler 14 during the high period of the second internal clock signal CLK2.

The voltage level of the first adjusted reference signal VREFo varies with the voltage level of the data signal that has been sampled by the second sampler 14 in the preceding data bit period, and the voltage level of the second adjusted reference signal VREFe varies with the voltage level of the data signal that has been sampled by the first sampler 12 in the preceding data bit period. That is, to identify the logic level (or data value) of the data signal sampled in the current data bit period, the signal receiver apparatus 100 utilizes the first and second adjusted reference signal VREFo or VREFe, which varies dynamically according to the voltage level of data inputted in the preceding data bit period.

The determining circuit 26 compares the data signal d1 or d2 sampled in a current cycle of the first or second internal clock signal CLK1 or CLK2 with the first or second adjusted reference signal VREFo or VREFe outputted from the reference signal generating circuit 20, and identifies the logic level ("0" or "1") of the received data signal DATA. The determining circuit 26 is comprised of a first comparator 28 and a second comparator 30. An output d1 of the first sampler 12 is provided to a positive input terminal of the first comparator 28, and an output VREFo of the first average circuit 22 is provided to a negative input terminal of the first comparator 28. An output d2 of the second sampler 14 is provided to a positive input terminal of the second comparator 30, and an output VREFe of the second average circuit 24 is provided to a negative input terminal of the second comparator 30.

The latch circuit 32 includes first and second latches 34 and 36 that respectively latch outputs OCP1 and OCP2 of the first and second comparators 28 and 30, respectively. The latches 34 and 36 consist of CMOS inverter circuits or flip-flop circuits.

The signal receiver apparatus 100 further includes a selection circuit 38 such as a 2×1 multiplexer. An output DQo of the first latch 34 is coupled to one input terminal IN1 of the selection circuit 38, and an output DQe of the second latch 36 is coupled to the other input terminal IN2 of the selection circuit 38. A selection terminal SEL of the selection circuit 38 is supplied with, for example, the first internal clock signal CLK1. It will be understood by those skilled in the art that the second internal clock signal CLK2 or any individual clock signal may be provided to the selection terminal SEL of the selection circuit 38. An output DQ of the selection circuit 38 is provided to the function circuit 140 having specific functions such as data storing and data processing. The selection circuit 38 provides the selected latch output to the function circuit 140 as data DQ, which is the same data stream as the received data DATA. Specifically, the selection circuit 38 alternatively multiplexes odd-numbered data and even-numbered data that are sampled in synchronization with the first and second internal clock signals CLK1 or CLK2.

The signal receiver apparatus 100 identifies the input signal level by use of an adjusted reference signal that adaptively varies with the voltage level of the preceding input data signal. Instead of a fixed reference signal VREF, the adjusted reference signal varies as shown by the dashed line and horizontal line segments in FIG. 3. Thus, the signal receiver apparatus 100 identifies the logic level of a received signal accurately even if the transmission speed is high or noises are generated.

Figure 5:
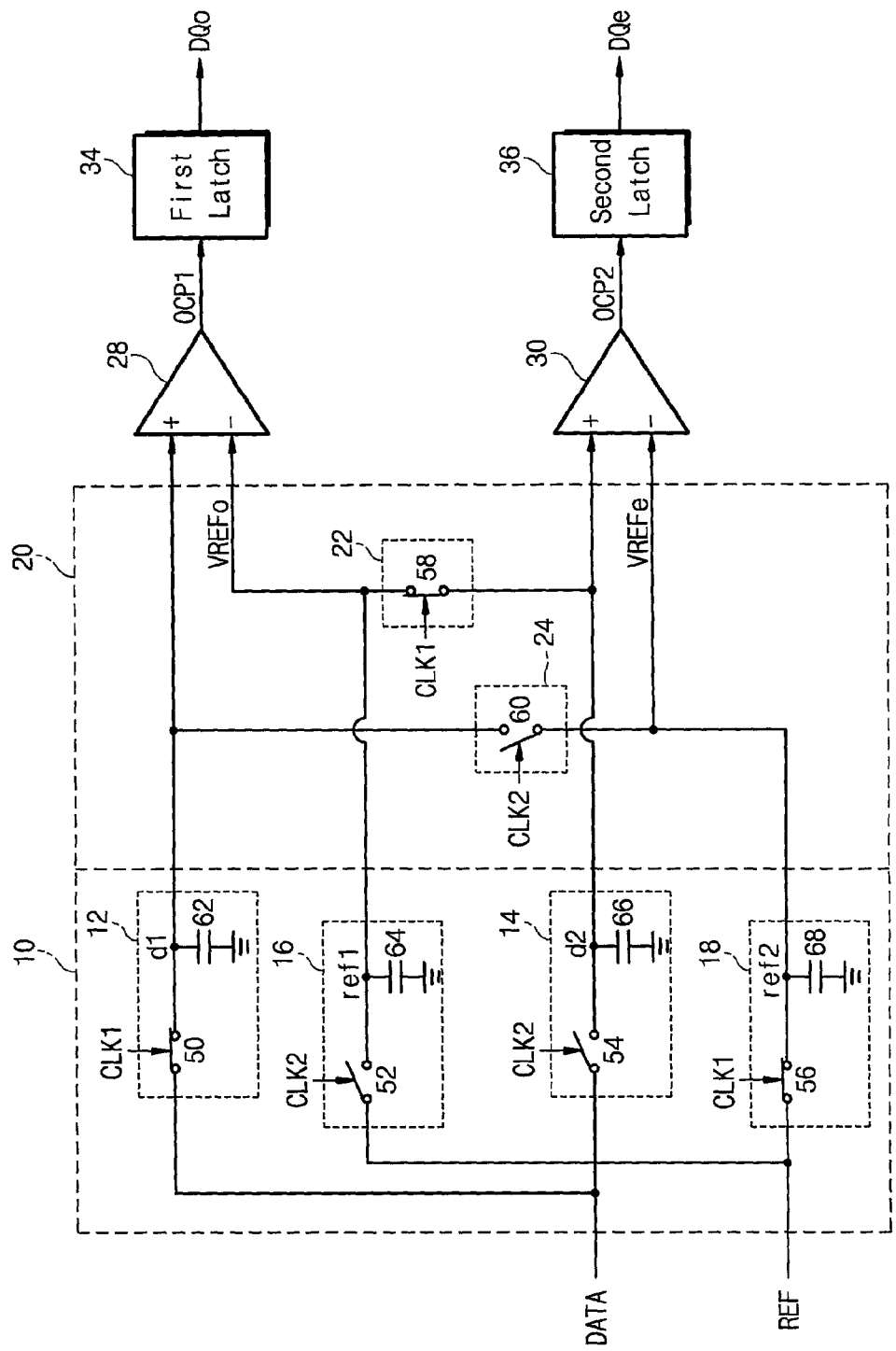
FIG. 5 is a circuit diagram of the sampling circuit and the reference signal generating circuit shown in FIG. 2.

FIG. 5 illustrates a detailed circuit diagram of the sampling circuit 10 and the reference signal generating circuit 20 illustrated in FIG. 2. Each of the first through fourth samplers 12, 14, 16, and 18 is comprised of a switch element and a capacitor. In this embodiment, the capacitors have the same capacitance so that charge-sharing between the capacitors generates an average voltage of sampled voltages. However, according to various embodiments, the capacitance of each capacitor may be different. In that case the result of charge-sharing may not simply be an average of the voltages sampled by each capacitor. In the first sampler 12, a first terminal of a switch element 50 is coupled to the data signal DATA, and a second terminal thereof is coupled to the positive input terminal of the first comparator 28. The switch element 50 is switched-on or switched-off in response to the first internal clock signal CLK1. A first terminal of a capacitor 62 is coupled to the second terminal of the switch element 50, and a second terminal thereof is coupled to a ground voltage.

In the second sampler 14, a first terminal of a switch element 54 is coupled to the data signal DATA, and a second terminal thereof is coupled to the positive input terminal of the second comparator 30. The switch element 54 is switched-on or switched-off in response to the second internal clock signal CLK2. A first terminal of a capacitor 66 is coupled to the second terminal of the switch element 54, and a second terminal thereof is coupled to the ground voltage.

In the third sampler 16, a first terminal of a switch element 52 is coupled to the fixed reference signal REF, and a second terminal thereof is coupled to the negative input terminal of the first comparator 28. The switch element 52 is switched-on or switched-off in response to the second internal clock signal CLK2.

In the fourth sampler 18, a first terminal of a switch element 56 is coupled to the fixed reference signal REF, and a second terminal thereof is coupled to the negative input terminal of the second comparator 30. The switch element 56 is switched-on or switched-off in response to the first internal clock signal CLK1. A first terminal of a capacitor 68 is coupled to the second terminal of the switch element 56, and a second terminal thereof is coupled to the ground voltage.

Each of the first and second average circuits 22 and 24 within the reference signal generating circuit 20 is comprised of one switch element. In the first average circuit 22, a first terminal of a switch element 58 is coupled to the negative input terminal of the first comparator 28, and a second terminal thereof is coupled to the positive input terminal of the second comparator 30. The switch element 58 is switched-on or switched-off in response to the first internal clock signal CLK1.

In the second average circuit 24, a first terminal of a switch element 60 is coupled to the negative input terminal of the second comparator 30, and a second terminal thereof is coupled to the positive input terminal of the first comparator 28. The switch element 60 is switched-on or switched-off in response to the second internal clock signal CLK2.

In the above-described sampling circuit 10 and reference signal generating circuit 20, switch elements can be comprised of semiconductor transistor devices such as MOS transistors and bipolar transistors.

Figure 6:
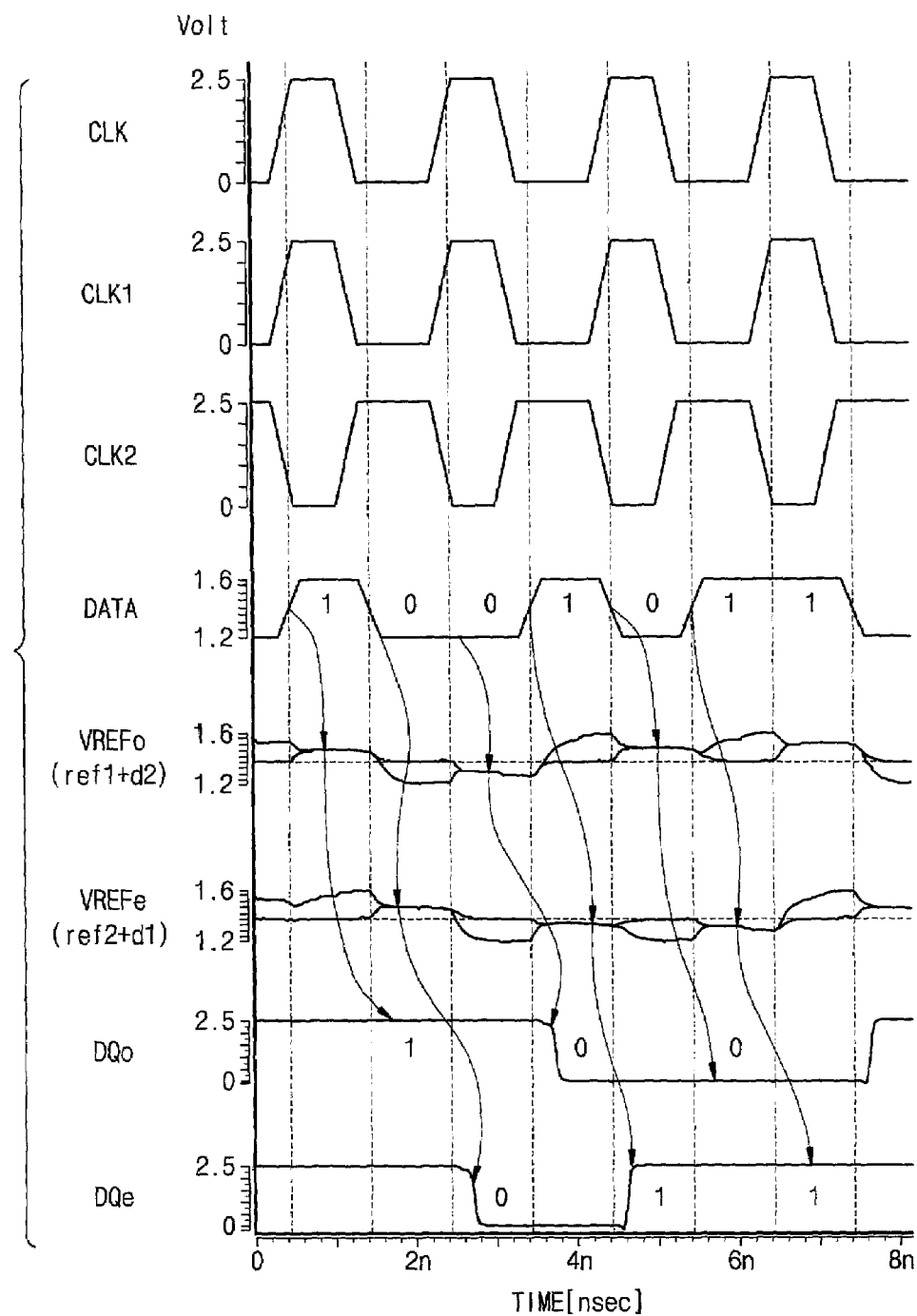
FIG. 6 is a waveform diagram of signals input and output from circuit elements as shown in FIG. 5.

FIG. 6 illustrates waveforms of signals input to and output from circuit elements shown in FIG. 5 when the data signal DATA of "1001011" is received in synchronization with the first and second internal clock signals CLK1 or CLK2. Referring to FIG. 6, the first and second internal clock signals CLK1 and CLK2 are generated by the clock generator 110 that operates in synchronization with the external clock signal CLK. The first and second internal clock signals CLK1 and CLK2 are complementary signals whose phases are opposite to each other. The data signal DATA is synchronized with the first and second internal clock signals CLK1 and CLK2.

Prior to describing FIG. 6 in detail, it is assumed that capacitors 62 and 66 shown in FIG. 5 are charged with a logic high or logic "1" voltage (e.g., approximately 1.6V in one embodiment), and capacitors 64 and 68 are charged with a fixed reference voltage REF (e.g., approximately 1.4V in one embodiment).

Referring to FIG. 5 and FIG. 6, when the first internal clock signal CLK1 remains in an active or logic high state, switch elements 50, 56, and 58 are switched-on while switch elements 52, 54, and 60 are switched-off. Accordingly, the first data (odd-numbered data) of "1" (1.6V) is charged in the capacitor 62 through the switch element 50, and the fixed reference voltage REF (1.4V) is charged in the capacitor 68 through the switch element 56. The voltage d1 charged in the capacitor 62 is transferred to the positive input terminal of the first comparator 28. At this time, since the capacitors 64 and 66 become electrically connected by the switch element 58, the first adjusted reference voltage VREFo provided to the negative input terminal of the first comparator 28 becomes an average of the reference voltage ref1 (=the fixed reference voltage REF) stored by the capacitor 64 and the voltage d2 stored by the capacitor 66, e.g., (ref1+d2)/2=1.5V Therefore, the first comparator 28 accurately identifies the logic high level (1.6V) of the first data ("1"), and then the identified level is maintained as a logic high level DQo (approximately 2.5V) by the first latch 34.

When the second internal clock signal CLK2 becomes active, the switch elements 52, 54, and 60 are switched-on while switch elements 50, 56, and 58 are switched-off. Accordingly, the fixed reference voltage REF (1.4V) is charged in the capacitor 64 through the switch element 52 and the second data (even-numbered data) of "0" (e.g., approximately 1.2V) is charged in the capacitor 66 through the switch element 54. The voltage of the data d2 charged in the capacitor 66 is transferred to the positive input terminal of the second comparator 30. At this time, since the capacitors 62 and 68 become electrically connected by the switch element 60, the second adjusted reference voltage VREFe provided to the negative input terminal of the second comparator 30 becomes an average voltage of the voltage d1 stored by the capacitor 62 and the reference voltage ref2 (=the fixed reference voltage REF) stored by the capacitor 68, e.g., (d1+ref2)/2=1.5V Therefore, the second comparator 30 accurately identifies the logic low level (1.2V) of the second data ("0"), and then the identified level is maintained as a logic low level DQe (approximately 0V) by the second latch 36.

Thereafter, the switching elements 50, 52, 54, 56, 58, and 60 repeat the above-described switching operations in synchronization with the first and second internal clock signals CLK1 and CLK2, so as to identify the remaining data "01011".

According to the above described switching operations, the first latch 34 sequentially latches the odd-numbered data "1001", and the second latch 36 sequentially latches the even-numbered data "011".

As described above, the signal receiver apparatus 100 utilizes the first or second adjusted reference signal VREFo or VREFe, which varies with the voltage level of the received input signal DATA in the preceding data bit period, to identify the logic state (or value) of data sampled in the current data bit period. Thus, the signal receiver apparatus 100 improves the accuracy of identifying the received data value, irrespective of transmission speed and noise.

In one modified embodiment, an input of the selection circuit 38 is coupled to an output of the determining circuit 26, and an input of the latch circuit 32 is coupled to an output of the selection circuit 38. In this case, the latch circuit 32 can be implemented with only one latch.

In another modified embodiment, the signal receiver apparatus 100 includes a parallel-to-serial converter instead of the selection circuit 38. A parallel input of the parallel-to-serial converter is coupled to an output of the latch circuit 32.

Figure 7:
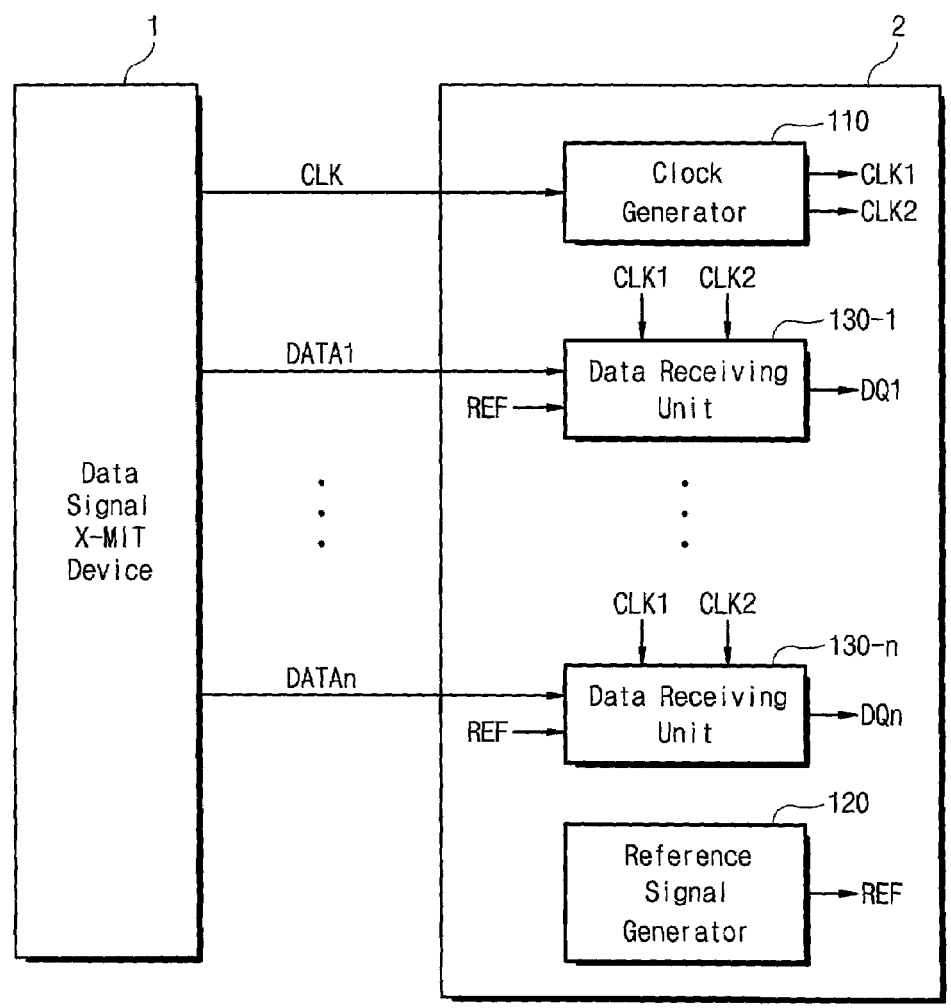
FIG. 7 is a schematic diagram showing an example of a semiconductor integrated circuit device including a signal receiver apparatus according to the present invention.

FIG. 7 illustrates one example of a semiconductor integrated circuit device having the signal receiver apparatus of the present invention. A semiconductor IC device 2 may be a semiconductor memory or a microprocessor, which has a plurality of data lines DATA1-DATAn. The semiconductor IC device 2 receives a clock signal CLK from a data signal transmission device 1 that is another semiconductor integrated circuit.

Referring to FIG. 7, the IC device 2 includes a clock generator 110, a reference signal generator 120, and a plurality of data receiving units 130-1 to 130-n. The clock generator 110 and the reference signal generator 120 each have the same circuit configurations as those in shown in FIG. 2. And, each of the data receiving units 130-1 to 130-n has the same circuit configuration as the data receiving unit 130 shown in FIG. 2.

The semiconductor IC device 2 can externally be supplied with the first and second internal clock signals CLK1 and CLK2. In such a case, the IC device 2 does not need the clock generator 110. In addition, if the IC device 2 is externally supplied with the fixed reference signal REF, then the IC device 2 does not need the reference signal generator 120.

As described above, since the signal receiver apparatus of the invention identifies the logic level (or data value) of the data received and sampled in a current data bit period using an adjusted reference signal that varies with the voltage level of the input signal received in the preceding data bit period, the accuracy of identifying the data value represented by the input signal can be improved irrespective of transmission speed and noise.

It is claimed:

1. A method for detecting a logic state represented by an input signal, comprising:
   sampling an input signal voltage;
   generating a reference voltage based on a most recent previously sampled input signal voltage; and
   determining a logic state represented by a current sample of the input signal voltage based on the generated reference signal; wherein
   the sampling step includes,
      sampling an input signal during a high period of a first clock signal to generate a first input signal voltage, and
      sampling the input signal during a high period of a second clock signal to generate a second input signal voltage, the second clock signal being an inverse of the first clock signal;
   the generating step includes,
      generating a first reference voltage based on the second input signal voltage during the high period of the first clock signal, and
      generating a second reference voltage based on the first input signal voltage during the high period of the second clock signal; and
   the determining step includes,
      determining a first logic state represented by the first input signal voltage by comparing the first input signal voltage to the first reference voltage, and
      determining a second logic state represented by the second input signal voltage by comparing the second input signal voltage to the second reference signal.

2. The method of claim 1, wherein
   the generating a first reference voltage step generates the first reference voltage as a charge-shared voltage between the second input signal voltage and a fixed reference voltage; and
   the generating a second reference voltage step generates the second reference voltage as a charge-shared voltage between the first input signal voltage and the fixed reference voltage.

3. The method of claim 1, wherein
the determining a first logic state step determines the first logic state as high when the first input signal voltage is greater than the first reference voltage, and determines the first logic state as low when the first input signal voltage is less than the first reference voltage; and
the determining a second logic state step determines the second logic state as high when the second input signal voltage is greater than the second reference voltage, and determines the second logic state as low when the second input signal voltage is less than the second reference voltage.

4. The method of claim 1, further comprising: generating the first and second clock signals.

5. A method for detecting a logic state of an input signal, comprising:
receiving a fixed reference voltage;
adjusting the fixed reference voltage to generate an adjusted reference voltage;
determining a logic state represented by a current sample of an input signal voltage based on the adjusted reference voltage;
sampling the input signal according to a first clock signal to generate a first input signal voltage;
sampling the input signal according to a second clock signal to generate a second input signal voltage, the second clock signal being an inverse of the first clock signal; and wherein
the adjusting step includes,
    adjusting the fixed reference voltage based the second input signal voltage according to the first clock signal to produce a first adjusted reference voltage, and
    adjusting the fixed reference voltage based on the first input signal voltage according to the second clock signal to produce a second adjusted reference voltage; and
the determining step includes,
    determining a first logic state represented by the first input signal voltage by comparing the first input signal voltage to the first adjusted reference voltage, and
    determining a second logic state represented by the second input signal voltage by comparing the second input signal voltage to the second adjusted reference signal.

6. The method of claim 5, wherein
the adjusting the fixed reference voltage to produce a first adjusted reference voltage step adjusts the fixed reference voltage by charge-sharing the fixed reference voltage with the second input signal voltage; and
the adjusting the fixed reference voltage to produce a second adjusted reference voltage step adjusts the fixed reference voltage by charge-sharing the fixed reference voltage with the first input signal voltage.

7. The method of claim 6, wherein
the determining a first logic state step determines the first logic state as high when the first input signal voltage is greater than the first adjusted reference voltage, and determines the first logic state as low when the first input signal voltage is less than the first adjusted reference voltage; and
the determining a second logic state step determines the second logic state as high when the second input signal voltage is greater than the second adjusted reference voltage, and determines the second logic state as low when the second input signal voltage is less than the second adjusted reference voltage.

8. The method of claim 5, further comprising: generating the first and second clock signals.

9. A semiconductor integrated circuit having an apparatus for detecting a logic state represented by an input signal, comprising:
a reference signal generating circuit generating a reference voltage based on a most recent previously sampled input signal voltage; and
a determining circuit determining a logic state represented by a current sample of the input signal voltage based on the reference voltage;
a first sampler sampling an input signal according to a first clock signal to generate a first input signal voltage, and
a second sampler sampling the input signal according to a second clock signal to generate a second input signal voltage, the second clock signal being an inverse of the first clock signal; wherein
the reference signal generating circuit generates a first reference voltage based on the second input signal voltage according to the first clock signal, and generates a second reference voltage based on the first input signal voltage according to the second clock signal; and
the determining circuit determines a first logic state represented by the first input signal voltage by comparing the first input signal voltage to the first reference voltage, and determines a second logic state represented by the second input signal voltage by comparing the second input signal voltage to the second reference signal.

10. The semiconductor integrated circuit of claim 9, wherein the reference signal generating circuit comprises:
a first average circuit generating the first reference voltage as a charge-shared voltage of the second input signal voltage and a fixed reference voltage; and
a second average circuit generating the second reference voltage as a charge-shared voltage of the first input signal voltage and the fixed reference voltage.

11. The semiconductor integrated circuit of claim 10, wherein the deterriuning circuit comprises:
a first comparator determining the first logic state as high when the first input signal voltage is greater than the first reference voltage, and determining the first logic state as low when the first input signal voltage is less than the first reference voltage; and
a second comparator determining the second logic state as high when the second input signal voltage is greater than the second reference voltage, and determining the second logic state as low when the second input signal voltage is less than the second reference voltage.

12. The semiconductor integrated circuit of claim 9, further comprising:
a clock signal generator generating the first and second clock signals.

13. The semiconductor integrated circuit of claim 9, wherein the first sampler, the second sampler, and the reference signal generating circuit receive externally generated first and second clock signals.

14. A semiconductor integrated circuit having an apparatus for detecting a logic state represented by an input signal, comprising:
a reference signal generating circuit receiving a fixed reference voltage and adjusting the fixed reference voltage to generate an adjusted reference voltage; and
a determining circuit determining a logic state represented by a current sample of the input signal voltage based on the adjusted reference voltage;

a first sampler sampling the input signal during a high period of a first clock signal to generate a first input signal voltage;

a second sampler sampling the input signal during a high period of a second clock signal to generate a second input signal voltage, the second clock signal being an inverse of the first clock signal; and wherein the reference signal generating circuit adjusts the fixed reference voltage based on the second input signal voltage during the high period of the first clock signal to produce a first adjusted reference voltage, and adjusts the fixed reference voltage based on the first input signal voltage during the high period of the second clock signal to produce a second adjusted reference voltage; and the determining circuit determines a first logic state represented by the first input signal voltage by comparing the first input signal voltage to the first adjusted reference voltage, and determines a second logic state represented by the second input signal voltage by comparing the second input signal voltage to the second adjusted reference signal.

15. The semiconductor integrated circuit of claim 14, wherein the reference signal generating circuit comprises:

a first average circuit adjusting the fixed reference voltage to produce a first adjusted reference voltage by charge-sharing the fixed reference voltage with the second input signal voltage; and a second average circuit adjusting the fixed reference voltage to produce a second adjusted reference voltage by charge-sharing the fixed reference voltage with the first input signal voltage.

16. The semiconductor integrated circuit of claim 15, wherein the determining circuit comprises:

a first comparator determining the first logic state as high when the first input signal voltage is greater than the first adjusted reference voltage, and determining the first logic state as low when the first input signal voltage is less than the first adjusted reference voltage; and a second comparator determining the second logic state as high when the second input signal voltage is greater than the second adjusted reference voltage, and determining the second logic state as low when the second input signal voltage is less than the second adjusted reference voltage.

17. The semiconductor integrated circuit of claim 14, further comprising:

a clock signal generator generating the first and second clock signals.

18. The semiconductor integrated circuit of claim 14, wherein the first sampler, the second sampler, and the reference signal generating circuit receive extemaliy generated first and second clock signals.

* * * * *